United States Patent Office 3,381,976
Patented May 7, 1968

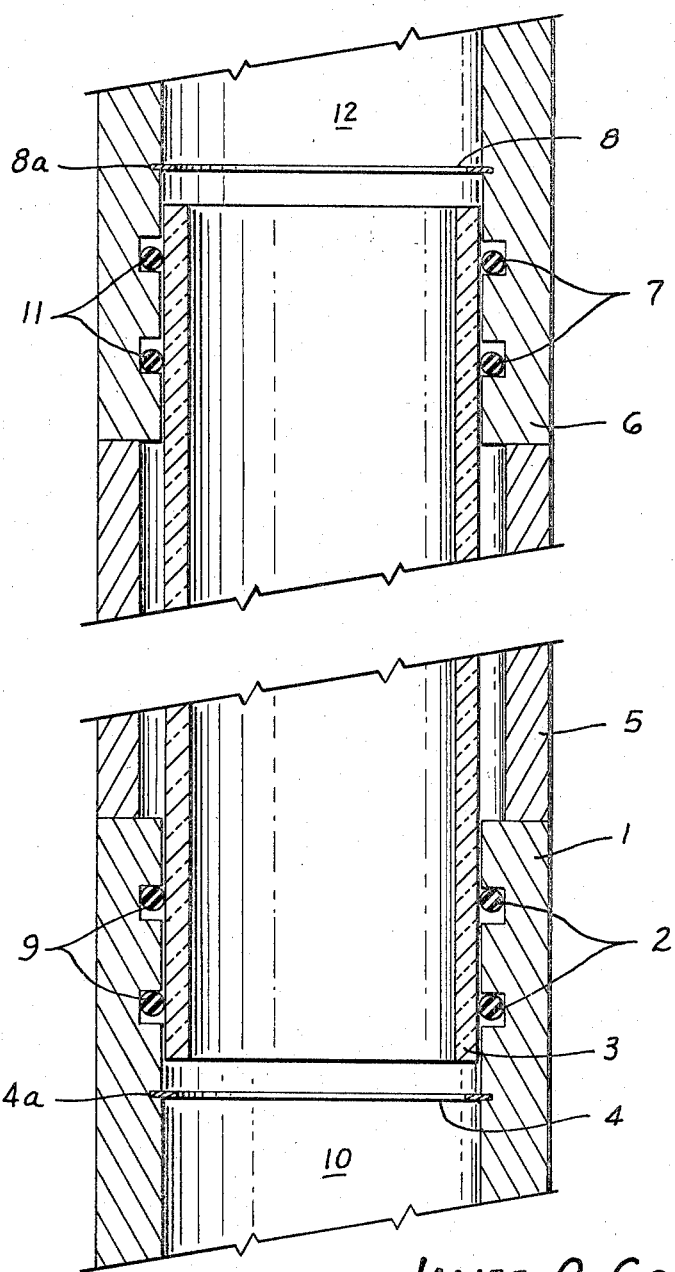

3,381,976
TUBING ADAPTER
James O. Goodson, Baytown, Tex. 77520, and
Lloyd E. Reisner, Houston, Tex.
Continuation of application Ser. No. 453,335, May 5, 1965. This application Mar. 13, 1967, Ser. No. 622,652
2 Claims. (Cl. 285—18)

ABSTRACT OF THE DISCLOSURE

A tubing adapter for connecting to the end of the outer tube of a liquid level sight gage. The adapter has a body with an opening into which the inner tube of transparent material extends. The opening in the body and the seals between the body and the inner tube are arranged to allow the inner tube to be moved longitudinally through the opening into and out of position in the outer tube without disrupting the connection between the end of the outer tube and the adapter.

---

This application is a continuation of our co-pending application Ser. No. 453,335, filed May 5, 1965, entitled, "Tubing Adapter" and now abandoned.

This invention relates generally to tubing adapters. Specifically, this invention relates to adapters for liquid level sight gages having an inner transparent tube and an outer protecting tube surrounding the inner tube. The adapters are connected to each end of the outer tube and each has a cylindrical bore aligned with the outer tube. The inner tube is positioined within the outer tube and adapters and is held in sealed relation by pressure energized seals in the adapters. Thus the inner tube may move longitudinally relative to the outer tube and adapters as required by the expansion of the different materials without producing undue stresses in the various components. Further the inner tube is positioned within the outer tube and adapters by passing it through the bore of one of the adapters thus making it unnecessary to separate the outer tube from the adapter when inserting the inner tube into position.

It is an object of this invention to provide an adapter for connecting together the inner transparent tube of a liquid level sight gage with the outer tube, which protects the inner tube, so that the inner tube can be removed from the outer tube by moving it longitudinally through the adapter without having to break the connection between the adapter and the outer tube.

The invention will now be described in detail in connection with the attached drawing, which is a vertical cross section through the preferred embodiment of the liquid level sight gage of this invention.

The liquid level sight gage in the drawing includes an outer tube 5 and an inner tube 3. Outer tube 5 provides a protective sheath for the inner tube, which is made of a transparent material, such as glass, which may be easily broken.

Adapters are provided to connect the ends of outer and inner tubes. These adapters are identical, therefore only the one connecting the lower ends of the tubes will be described in detail.

This adapter includes adapter body 1. In the embodiment shown, the adapter body is tubular having opening 10 into which inner tube 3 extends. The upper end of the adapter body is connected to the lower end of outer tube 5 by any suitable means. Its lower end is equipped with the necessary threads, flange or other type connection (not shown) required to attach the adapter to equipment, piping, etc. with which the sight gage is to be associated.

As can be seen in the drawings, the opening in adapter body 1 is such that inner tube 3 can be moved longitudinally through the opening into and out of position inside outer tube 5.

The adapter body is provided with internal annular grooves 9 in which annular seal rings 2 are located. These seal rings are pressure energized, being of the O-ring type. They provide a seal between the outside surface of the inner tube and the body to isolate the annular space between the inner and outer tubes from the fluid in the inner tube and adapter body.

To hold the inner tube in place inside the body and outer tube, a removable retainer is located in the opening in the body. In the embodiment shown, snap ring 4 is located in internal groove 4a to limit the distance the inner tube can move longitudinally in one direction relative to the outer tube and the body, when the inner tube is assembled in the outer tube.

In the embodiment shown, the upper ends of the inner and outer tubes are connected by an adapter similar to the one just described. It includes annular body 6 having opening 12 into which the upper end of inner tube 3 extends. The lower end of adapter body 6 is connected to the upper end of outer tube 5. Thus, the outer tube also serves to space the adapters apart the desired distance. Adapter body 6 is provided with annular grooves 11 to receive seal rings 7. These seal rings are pressure energized and isolate the fluid in the inner tube from the annular space between the two tubes. Removable retainer snap ring 8, located in groove 8a, limits the upward travel of the inner tube relative to the adapters and outer tube.

Inner tube 3 is a calculated length shorter than the distance between snap rings or retainers 4 and 8. This difference in length allows for the difference that the inner tube and the outer tube expand due to temperature changes, since they are made of different materials. It also allows for differences in length that might be caused by differences in the pressure in the tubes.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a liquid level sight gage including an elongated outer tube and an elongated inner tube of transparent material, said outer tube providing a protective sheath for the inner tube, the improvement in combination therewith of a tubing adapter connected to each end of the outer tube, each adapter comprising a body connected to one end of the outer tube in abutting relation, said body having a cylindrical opening therethrough aligned with the outer tube and into which the inner tube extends, said cylindrical opening being larger than the outside diameter of the inner tube to permit the inner tube to be inserted longitudinally through the cylindrical opening in the body and into the surrounding outer tube and to be likewise removed therefrom through the cylindrical opening without disconnecting the adapter body from the outer tube, said body having an internal annular groove encircling the portion of the inner tube extending into the cylindrical opening in the body, an annual seal ring positioned in said groove providing a pressure energized seal between the body and the outer surface of the inner tube to prevent the fluid in the inner tube and the cylindrical opening from reaching the annular space between the two tubes while allowing the inner tube to move longitudinally relative to the seal, and a removable retainer held in the cylindrical opening in the body to limit the distance the inner tube can move longitudinally in one direction relative to the outer tube and the body when the inner tube is assembled in the outer tube, the distance between the removable retainers being greater than the length of the inner tube so that the inner tube can move longitudinally relative to the outer tube and adapters, the seals in said adapters being positioned inwardly of the retainers so that throughout the longitudinal movement of the inner tube a seal is maintained adjacent both ends of the inner tube.

2. The invention as described in claim 1 and wherein each adapter has a plurality of seals therein and the removable retainer is a resilient ring like member which fits in an annular groove in the body wall forming the cylindrical opening.

References Cited
UNITED STATES PATENTS

| | | | |
|---|---|---|---|
| 1,032,766 | 7/1912 | Paul | 285—133 X |
| 2,105,747 | 1/1938 | Martin | 285—383 X |
| 2,655,124 | 10/1953 | Gary et al. | 116—117 |
| 2,660,144 | 11/1953 | Newman | 116—117 |
| 2,829,909 | 4/1958 | Magnani | 285—345 X |
| 3,104,905 | 9/1963 | Erdmann et al. | 285—321 X |

CARL W. TOMLIN, *Primary Examiner.*

D. W. AROLA, *Assistant Examiner.*